(12) United States Patent
Huang

(10) Patent No.: US 10,877,336 B2
(45) Date of Patent: Dec. 29, 2020

(54) DISPLAY PANEL AND METHOD FOR MANUFACTURING SAME

(71) Applicants: HKC Corporation Ltd., Shenzhen (CN); Chongqing HKC Optoelectronics Technology Co., Limited, Chongqing (CN)

(72) Inventor: Shishuai Huang, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 169 days.

(21) Appl. No.: 15/745,457

(22) PCT Filed: Dec. 21, 2017

(86) PCT No.: PCT/CN2017/117655
§ 371 (c)(1),
(2) Date: Jan. 17, 2018

(87) PCT Pub. No.: WO2019/085222
PCT Pub. Date: May 9, 2019

(65) Prior Publication Data
US 2020/0081305 A1 Mar. 12, 2020

(30) Foreign Application Priority Data
Nov. 3, 2017 (CN) .......................... 2017 1 1072903

(51) Int. Cl.
*H01L 27/14* (2006.01)
*H01L 29/04* (2006.01)
(Continued)

(52) U.S. Cl.
CPC ...... *G02F 1/136209* (2013.01); *G02F 1/1368* (2013.01); *G02F 1/133528* (2013.01);
(Continued)

(58) Field of Classification Search
CPC ......... G02F 1/136209; G02F 1/133528; G02F 1/136286; G02F 1/1368;
(Continued)

(56) References Cited

U.S. PATENT DOCUMENTS

2003/0063240 A1* 4/2003 Takizawa .......... G02F 1/133514
349/106
2007/0182885 A1* 8/2007 Egi ................... G02F 1/133528
349/96
(Continued)

FOREIGN PATENT DOCUMENTS

CN 101403832 A 4/2009
CN 106483706 A 3/2017
(Continued)

OTHER PUBLICATIONS

International Search Report dated Jul. 16, 2018, in the corresponding PCT application PCT/CN2017/117655,10 pages in Chinese, 2 pages in English

*Primary Examiner* — Calvin Y Choi
(74) *Attorney, Agent, or Firm* — Juan Carlos A. Marquez; Marquez IP Law Office, PLLC

(57) ABSTRACT

This application relates to a display panel and a method for manufacturing same. The display panel includes an active switch array substrate. The display panel includes: a display region; a bezel region, including a gate drive region and a wiring region; and a polarizer, including a shied region, disposed on the active switch array substrate. The bezel region surrounds the display region and is located on a periphery of the display panel. The gate drive region is
(Continued)

disposed on a periphery of the active switch array substrate. The shield region covers the gate drive region.

9 Claims, 4 Drawing Sheets

(51) Int. Cl.
*H01L 29/15* (2006.01)
*H01L 31/036* (2006.01)
*G02F 1/1362* (2006.01)
*G02F 1/1335* (2006.01)
*G02F 1/1368* (2006.01)

(52) U.S. Cl.
CPC ............... *G02F 1/136286* (2013.01); *G02F 2001/136295* (2013.01)

(58) Field of Classification Search
CPC ... G02F 2001/136295; G02F 1/133512; G02F 1/13; H01L 27/3244–3279; H01L 27/3251–3253; H01L 27/3272; H01L 27/1214–1296; G09G 3/3233–3258; G09G 2300/0408; G09G 3/3266–3291; G09G 2001/133388; H05K 2201/10136; B32B 2457/202

See application file for complete search history.

(56) References Cited

U.S. PATENT DOCUMENTS

| 2007/0216837 | A1 | 9/2007 | Ono | |
| 2009/0033643 | A1* | 2/2009 | Schmidt | G09G 3/20 345/205 |
| 2016/0291382 | A1* | 10/2016 | Chai | G02F 1/133308 |

FOREIGN PATENT DOCUMENTS

| CN | 106646999 A | 5/2017 |
| CN | 106918947 A | 7/2017 |

* cited by examiner

DISPLAY PANEL AND METHOD FOR MANUFACTURING SAME

BACKGROUND

Technical Field

This application relates to a display panel and a method for manufacturing the same, and in particular, to a display panel with a polarizer in a shield region and a method for manufacturing the same.

Related Art

With progress of technologies, liquid crystal displays (LCDs) with various advantages, such as power saving, no radiation, small volumes, low power consumption, flat panels, high resolution, and stable picture quality, and in particular, various current information products, such as mobile phones, notebook computers, digital cameras, PDAs, and liquid crystal screens, are becoming more popular. Accordingly, the demand for LCDs increases greatly. Therefore, active switch array liquid crystal displays (Thin Film Transistor Liquid Crystal Display, TFT-LCD) satisfying the pixel design with an increasing demand for high resolution and having superior attributes such as high picture quality, high space utilization efficiency, low power consumption, and no radiation have gradually become the mainstream of the market. An active switch array substrate is one of important components for assembling an LCD.

In addition, active switch array substrates are further grouped into opposite substrates having red, green, and blue photoresist layers (RGB on CF), active switch array substrates having red, green, and blue photoresist layers in in-plane switching liquid crystal panels (RGB on Array/In-Plane Switching, IPS mode), and active switch array substrates having red, green, and blue photoresist layers in vertical alignment liquid crystal panels (RGB on Array/Vertical Alignment, VA mode).

A liquid crystal display device is usually constructed in the following way: an opposite substrate including a drive component is disposed opposite to a color filter and a periphery is sealed, and a liquid crystal material is filled in a gap therein. In addition, the liquid crystal material has refractive index anisotropy, and may switch between on and off states and display pixels according to a difference between a state of regular arrangement in a manner of being along a direction where a voltage is applied to the liquid crystal material and a state where a voltage is not applied. Herein, an alignment film is disposed on substrates clamping the liquid crystal material, to align the liquid crystal material. In addition, LCDs are the most widely used displays in the current market, and in particular, are widely applied to liquid crystal televisions. For liquid crystal televisions, consumers not only purse higher definition, but also have higher requirements for appearance, such as a lighter and thinner design, a narrow bezel, and a curved surface. Consumers and panel designers always pursue bezel-less panels. In a general sense, bezel-less refers to there is no adhesive frame outside the panel, and glass is directly attached on the backlight. A chip on film on a gate side is removed from a gate driver product; a timing driver circuit is made on a glass substrate of an active switch array, so that an adhesive frame is not needed to protect the chip on film on the gate side, and therefore a bezel-less design can be achieved. A liquid crystal television uses an amorphous-silicon (a-Si) semiconductor technology and when transistors are used as a timing driver circuit, the size is large, wiring is complex, and a large quantity of parasitic capacitors is included. Therefore, a gate driver circuit has an extremely high risk of optical current leakage, and long-time illumination makes the reliability of a gate drive region fail, and consequently, the panel is faulty in display, and has short service life. In particular, when relevant technologies are used, a-Si remains below data lines; backlight emitted from a back side is directly illuminated onto the a-Si after passing through a lower polarizer, and the risk of optical current leakage is high.

SUMMARY

To resolve the foregoing technical problem, an objective of this application is to provide a display panel and a method for manufacturing same, so that the problem of optical current leakage in the gate drive region of a product is resolved, and the reliability and service life of the product can be improved.

The objective of this application is achieved and the technical problem of this application is resolved by using the following technical solutions. A display panel in this application comprises an active switch array substrate, comprising: a display region; a bezel region, comprising a gate drive region and a wiring region; and a polarizer, comprising a shield region, disposed on the active switch array substrate, wherein the bezel region surrounds the display region and is located on a periphery of the display panel, the gate drive region is disposed on a periphery of the active switch array substrate, and the shield region covers the gate drive region.

In an embodiment of this application, the wiring region is spaced from the gate drive region.

In an embodiment of this application, the shield layer is made of a hyperchromic light-absorbing material.

In an embodiment of this application, the hyperchromic light-absorbing material is a black substance.

In an embodiment of this application, a material of the black substance comprises a phenolic resin, a photosensitive compound, an organic colored polymeric dye, an inorganic colored dye, and a solvent, and the phenolic resin, the photosensitive compound, the organic colored polymeric dye, the inorganic colored dye, and the solvent are mixed with each other.

In an embodiment of this application, a periphery of the polarizer is dehydrated and carbonized into a shield region after being pretreated by using a chemical reagent.

In an embodiment of this application, the chemical reagent is a corrosive reagent.

In an embodiment of this application, the polarizer comprises a polarizing material layer, and a refractive index of the polarizing material is in a range of 2.0 to 3.2, and an extinction coefficient of the polarizing material is in a range of 2.7 to 3.5.

Another objective of this application is a method for manufacturing a display panel, comprising steps of: providing a first substrate, wherein the first substrate comprises a gate drive region; and forming a polarizer on the first substrate, wherein the polarizer is pretreated before being attached, so that a periphery of the polarizer comprises a shield region, and the shield region covers the gate drive region.

The technical problem of this application may be further resolved by taking the following technical measures.

In an embodiment of this application, the wiring region is spaced from the gate drive region.

In an embodiment of this application, the shield layer is made of a hyperchromic light-absorbing material.

In an embodiment of this application, the hyperchromic light-absorbing material is a black substance.

In an embodiment of this application, a material of the black substance comprises a phenolic resin, a photosensitive compound, an organic colored polymeric dye, an inorganic colored dye, and a solvent, and the phenolic resin, the photosensitive compound, the organic colored polymeric dye, the inorganic colored dye, and the solvent are mixed with each other.

In an embodiment of this application, according to the manufacturing method, a periphery of the polarizer is dehydrated and carbonized into a shield region after being pretreated by using a chemical reagent.

In an embodiment of this application, according to the manufacturing method, the chemical reagent is a corrosive reagent.

In an embodiment of this application, according to the manufacturing method, a periphery of the polarizer is carbonized into a shield region after high-temperature and high-pressure pretreatment.

In an embodiment of this application, according to the manufacturing method, the polarizer comprises a polarizing material layer, and a refractive index of the polarizing material is in a range of 2.0 to 3.2, and an extinction coefficient of the polarizing material is in a range of 2.7 to 3.5.

The beneficial effect of this application is: this application resolves the problem of optical current leakage in a gate drive region of a product and improves the reliability and service life of the product.

DETAILED DESCRIPTION

The following embodiments are described with reference to the accompanying drawings, used to exemplify specific embodiments for implementation of this application. Terms about directions mentioned in this application, such as "on", "below", "front", "back", "left", "right", "in", "out", and "side surface" merely refer to directions in the accompanying drawings. Therefore, the used terms about directions are used to describe and understand this application, and are not intended to limit this application.

The accompanying drawings and the description are considered to be essentially exemplary, rather than limitative. In the figures, modules with similar structures are represented by using the same reference number. In addition, for understanding and ease of description, the size and the thickness of each component shown in the accompanying drawings are arbitrarily shown, but this application is not limited thereto.

In the accompanying drawings, for clarity, thicknesses of a layer, a film, a panel, a region, and the like are enlarged. In the accompanying drawings, for understanding and ease of description, thicknesses of some layers and regions are enlarged. It should be understood that when a component such as a layer, a film, a region, or a base is described to be "on" "another component", the component may be directly on the another component, or there may be an intermediate component.

In addition, throughout the specification, unless otherwise explicitly described to have an opposite meaning, the word "include" is understood as including the component, but not excluding any other component. In addition, throughout the specification, "on" means one being located above or below a target component and does not necessarily mean one being located on the top based on a gravity direction.

To further describe the technical means used in this application to achieve the application objective and effects thereof, specific implementations, structures, features, and effects of a display panel and a method for manufacturing same provided according to this application are described in detail below with reference to the drawings and preferred embodiments.

A liquid crystal panel in this application may include an active switch array (Thin Film Transistor, TFT) substrate, a color filter layer (Color Filter, CF) substrate, and a liquid crystal layer formed between the two substrates.

In an embodiment, the liquid crystal panel in this application may be a curved-surface display panel.

In an embodiment, an active switch array (TFT) and a color filter layer (CF) in this application may be formed on a same substrate.

Figure 1A:
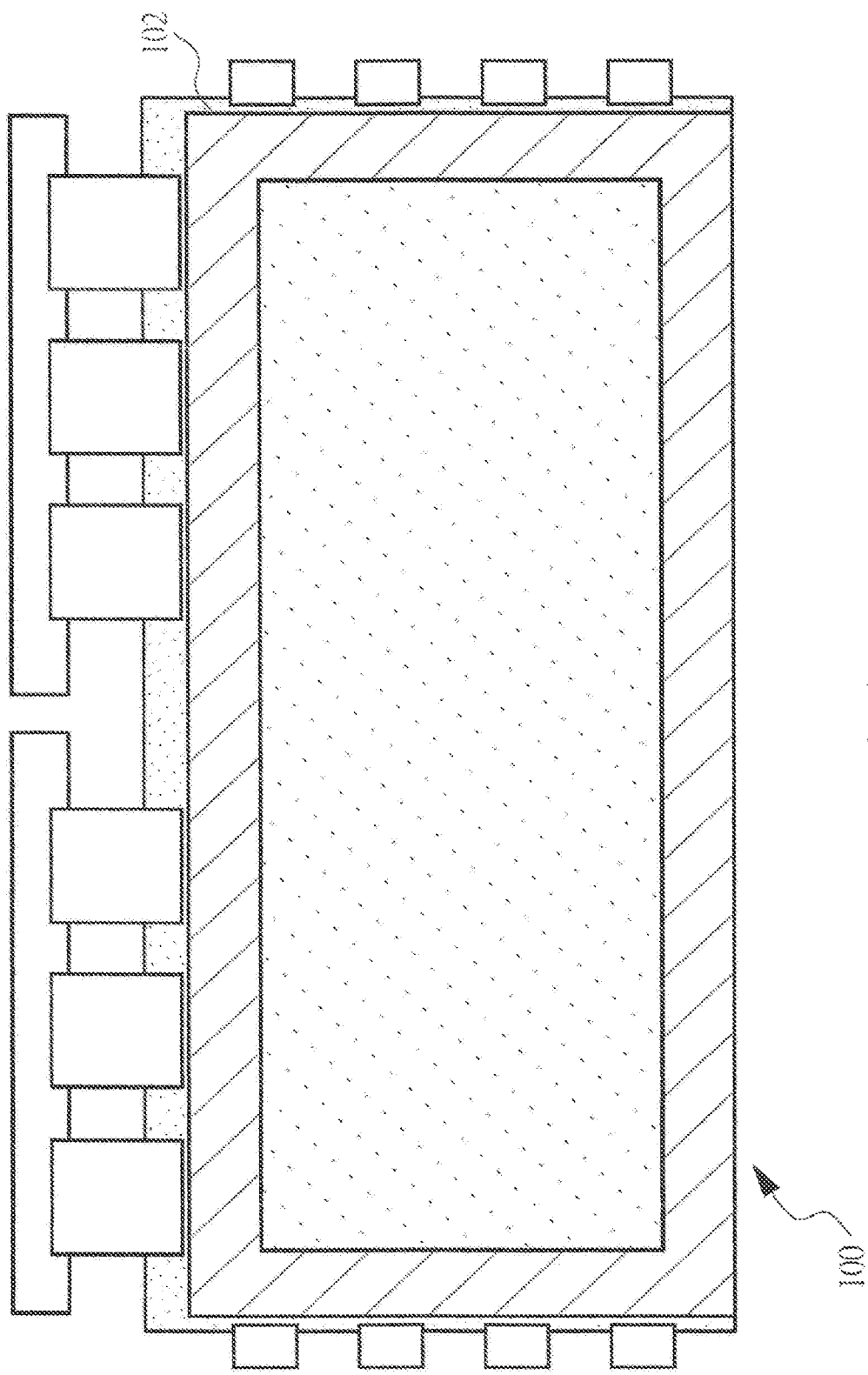
FIG. 1a is a schematic diagram of an exemplary LCD.

FIG. 1a is a schematic diagram of an exemplary LCD. Referring to FIG. 1a, an LCD 100 includes an adhesive material 102 for preventing side leakage of light on an edge of a bezel, to avoid the phenomenon of peripheral light leakage.

Figure 1B:
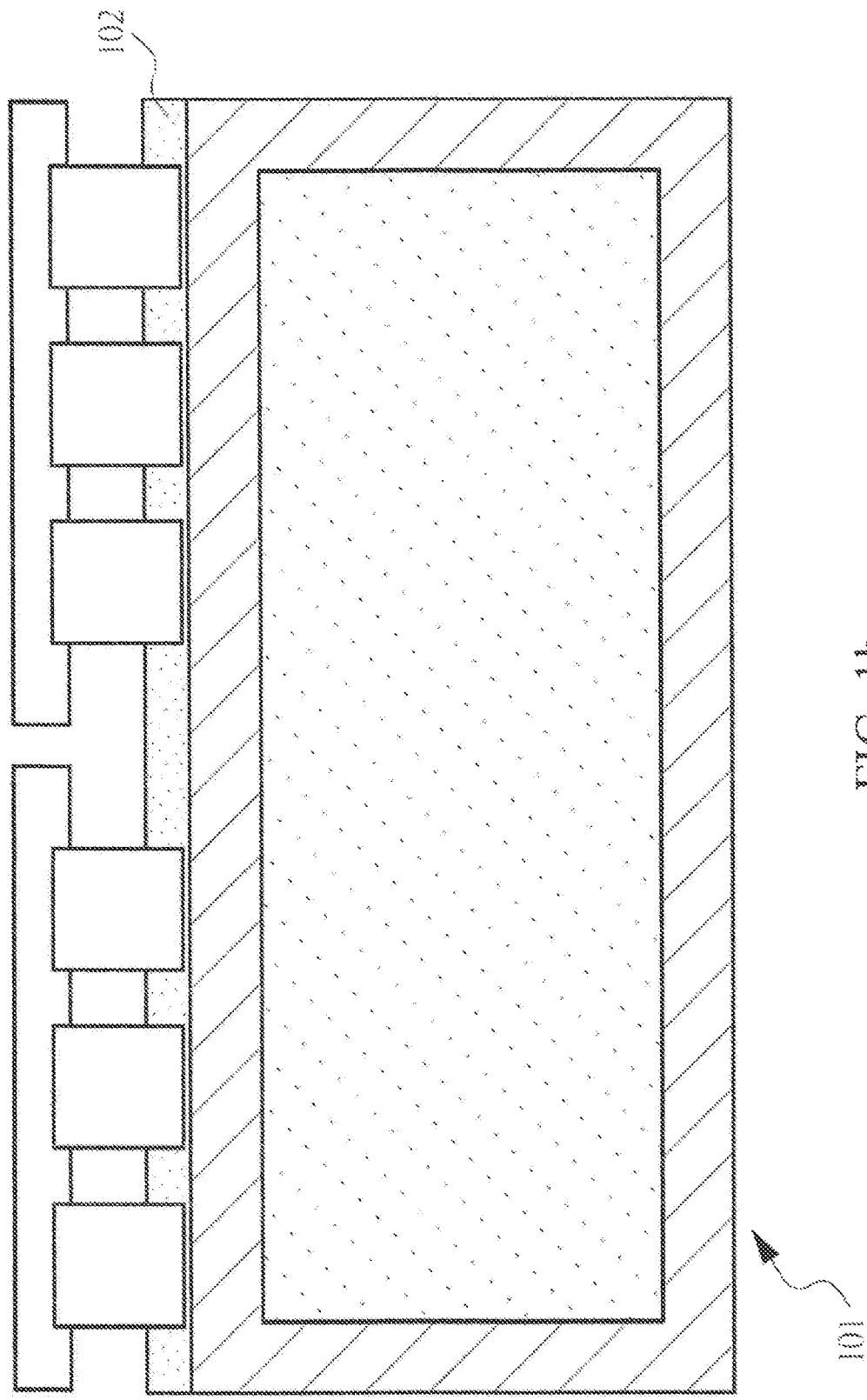
FIG. 1b is a schematic diagram of an LCD according to an embodiment of this application.

FIG. 1b is a schematic diagram of an LCD according to an embodiment of this application. Referring to FIG. 1b, in an embodiment of this application, a bezel of a bezel-less LCD 101 does not need to be protected by an adhesive material 102.

Figure 2:
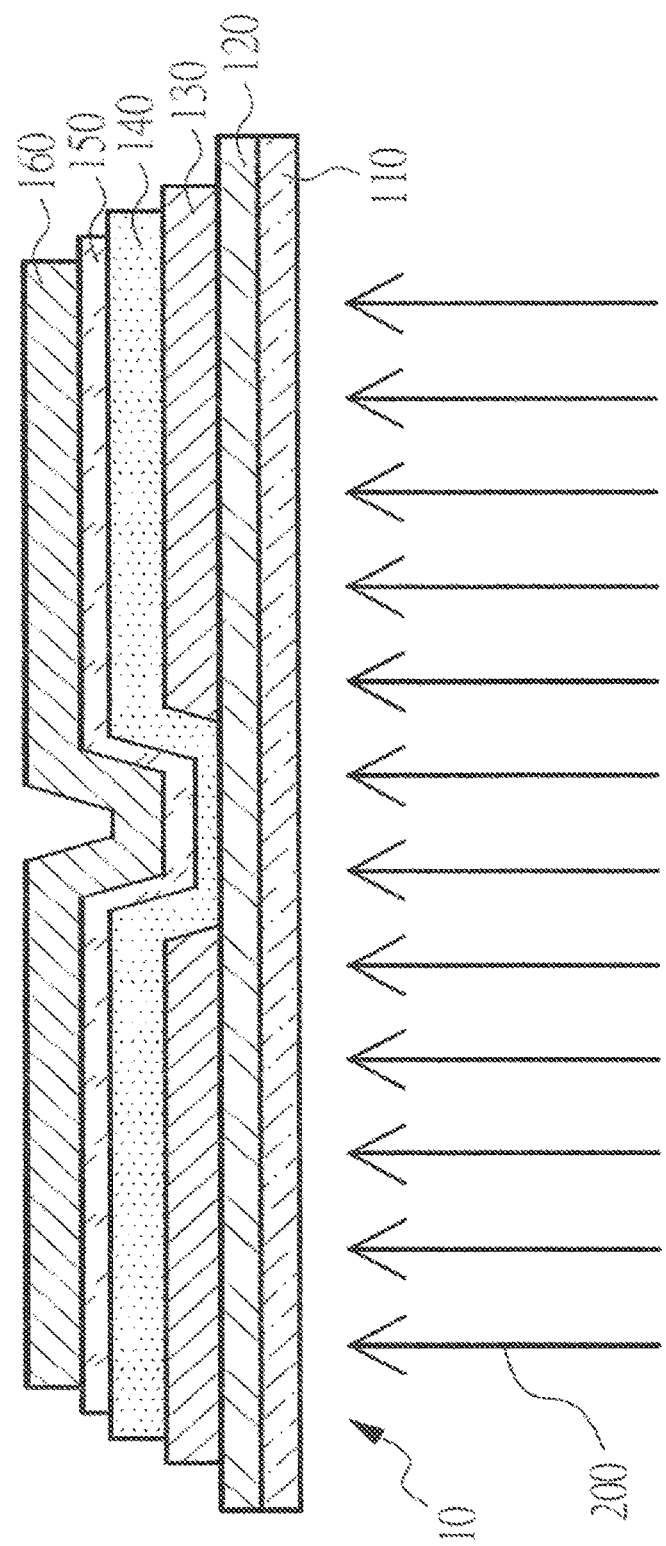
FIG. 2 is a schematic cross-sectional view of an exemplary active switch array substrate including a polarizer.

FIG. 2 is a schematic cross-sectional view of an exemplary active switch array substrate including a polarizer. Referring to FIG. 2, an active switch array substrate includes: a first substrate 120; a plurality of scanning lines 130, formed on the first substrate 120; a cover layer 140, formed on the first substrate 120, and covering the plurality of scanning lines 130; an a-Si layer 150, formed on the cover layer 140; a plurality of data lines 160, formed on the a-Si layer 150, where the plurality of data lines 160 and the plurality of scanning lines 130 define a plurality of pixel regions; and a polarizer 110, formed on an outer surface of the first substrate 120.

In an embodiment, light 200 passing through the polarizer 110 is illuminated onto the a-Si layer 150.

Figure 3:
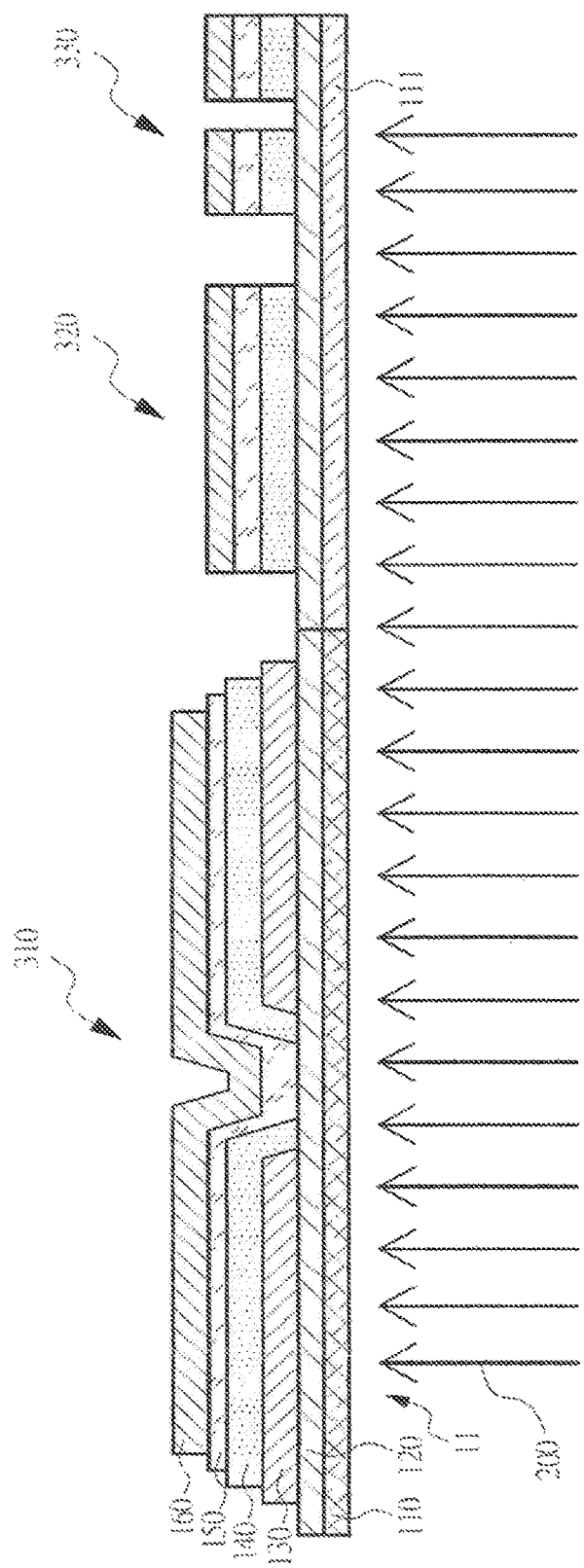
FIG. 3 is a schematic cross-sectional view of an active switch array substrate according to an embodiment of this application.

FIG. 3 is a schematic cross-sectional view of an active switch array substrate according to an embodiment of this application. Referring to FIG. 3, in an embodiment of this application, a display panel 11 includes an active switch array substrate including a gate drive region 310. The active switch array substrate includes: a first substrate 120; a plurality of scanning lines 130, formed on the first substrate 120; a cover layer 140, formed on the first substrate 120, and covering the plurality of scanning lines 130; an a-Si layer 150, formed on the first substrate 120, and covering the cover layer 140; a plurality of data lines 160, formed on the a-Si layer 150, where the plurality of data lines 160 and the plurality of scanning lines 130 define a plurality of pixel regions; and a polarizer 110, 111, formed on an outer surface of the first substrate 120, where the polarizer 110, 111 includes a shield region 110 and a light-permeable region 111. The display panel 11 includes a display region 320 and a bezel region 310, 320. The bezel region 310, 320 surrounds the display region 330 and is located on a periphery of the display panel 11. The bezel region 310, 320 includes a gate drive region 310 and a wiring region 320. The shield region 110 covers the gate drive region 310.

In an embodiment, the wiring region 320 is spaced from the gate drive region 310.

In an embodiment, a periphery of the polarizer 110, 111 is dehydrated and carbonized into a shield region 110 after being pretreated by using a chemical reagent.

In an embodiment, the chemical reagent is a corrosive reagent.

In an embodiment, a periphery of the polarizer 110, 111 is carbonized into a shield region 110 after high-temperature and high-pressure pretreatment.

In an embodiment, the shield region 110 is made of a hyperchromic light-absorbing material, for example, a black substance.

In an embodiment, the material of the black substance includes a phenolic resin, a photosensitive compound, an organic colored polymeric dye, an inorganic colored dye, and a solvent. The phenolic resin, the photosensitive compound, the organic colored polymeric dye, the inorganic colored dye, and the solvent are mixed with each other. Preferably, the weight percentage of the phenolic resin is in a range of 25% to 50%, the weight percentage of the photosensitive compound is in a range of 1% to 5%, the weight percentage of the organic colored polymeric dye is in a range of 1% to 20%, and the weight percentage of the solvent is in a range of 50% to 75%. The solvent may be propylene glycol monomethyl ether acetate.

In an embodiment, the polarizer 110, 111 includes a polarizing material layer. Preferably, the value of the refractive index of the polarizing material is in a range of 2.0 to 3.2, and the value of the extinction coefficient of the polarizing material is in a range of 2.7 to 3.5, to make the extinction ratio excellent. Specifically, a molybdenum silicide material (sometimes referred to as an MoSi material below) containing Mo and Si, a nitrided molybdenum silicide material, or the like may be listed as a polarizing material having such a refractive index and extinction coefficient. Preferably, the molybdenum silicide material is used as the polarizing material. The reason lies in: the values of the refractive index and the extinction coefficient can be easily adjusted according to contents of elements such as Mo, Si, nitrogen, and oxygen contained in the molybdenum silicide material, and the foregoing refractive index and extinction coefficient can be easily satisfied under the wavelength of an ultraviolet region. The reason lies in: the molybdenum silicide material also has optical rotation for short wavelengths of the ultraviolet region, and is adapted for alignment of an optical alignment film of a liquid crystal display device.

Referring to FIG. 3 again, in an embodiment of this application, a method for manufacturing a display panel 11 includes steps of: providing a first substrate 120 including a gate drive region 310 and a wiring region 320; forming a plurality of scanning lines 130 on the first substrate 120; forming a cover layer 140 on the first substrate 120, where the cover layer 140 covers the plurality of scanning lines 130; forming an a-Si layer 150 on the first substrate 120, where the a-Si layer 150 covers the cover layer 140; forming a plurality of data lines 160 on the a-Si layer 150, where the plurality of data lines 160 and the plurality of scanning lines 130 define a plurality of pixel regions; and forming a polarizer 110, 111 on an outer surface of the first substrate 120, where the polarizer 110, 111 includes a shield region 110 and a light-permeable region 111. The polarizer 110, 111 is pretreated before being attached, so that a periphery of the polarizer 110, 111 includes a shield region 110, and the shield region 110 covers the gate drive region 310.

In an embodiment, the wiring region 320 is spaced from the gate drive region 310.

In an embodiment, according to the manufacturing method, forming the shield region 110 on an outer surface of the first substrate 120 includes: pretreating the polarizer 110 below the gate drive region 310, so that backlight cannot pass through the polarizer 110, and therefore the gate drive region 310 can be prevented from being illuminated by the backlight, thereby alleviating the impact of optical current leakage.

In an embodiment, according to the manufacturing method, a periphery of the polarizer 110, 111 is dehydrated and carbonized into a shield region 110 after being pretreated by using a chemical reagent.

In an embodiment, according to the manufacturing method, the chemical reagent is a corrosive reagent.

In an embodiment, according to the manufacturing method, a periphery of the polarizer 110, 111 is carbonized into a shield region 110 after high-temperature and high-pressure pretreatment.

In an embodiment, the shield region 110 is made of a hyperchromic light-absorbing material, for example, a black substance.

In an embodiment, according to the manufacturing method, the material of the black substance includes a phenolic resin, a photosensitive compound, an organic colored polymeric dye, an inorganic colored dye, and a solvent. The phenolic resin, the photosensitive compound, the organic colored polymeric dye, the inorganic colored dye, and the solvent are mixed with each other. Preferably, the weight percentage of the phenolic resin is in a range of 25% to 50%, the weight percentage of the photosensitive compound is in a range of 1% to 5%, the weight percentage of the organic colored polymeric dye is in a range of 1% to 20%, and the weight percentage of the solvent is in a range of 50% to 75%. The solvent may be propylene glycol monomethyl ether acetate.

In an embodiment, according to the manufacturing method, the polarizer 110, 111 includes a polarizing material layer. Preferably, the value of the refractive index of the polarizing material is in a range of 2.0 to 3.2, and the value of the extinction coefficient of the polarizing material is in a range of 2.7 to 3.5, to make the extinction ratio excellent. Specifically, a molybdenum silicide material (sometimes referred to as an MoSi material below) containing Mo and Si, a nitrided molybdenum silicide material, or the like may be listed as a polarizing material having such a refractive index and extinction coefficient. Preferably, the molybdenum silicide material is used as the polarizing material. The reason lies in: the values of the refractive index and the extinction coefficient can be easily adjusted according to contents of elements such as Mo, Si, nitrogen, and oxygen contained in the molybdenum silicide material, and the foregoing refractive index and extinction coefficient can be easily satisfied under the wavelength of an ultraviolet region. The reason lies in: the molybdenum silicide material also has optical rotation for short wavelengths of the ultraviolet region, and is adapted for alignment of an optical alignment film of a liquid crystal display device.

In an embodiment, according to the manufacturing method, only the polarizer 110 below the gate drive region 310 needs to be pretreated, and the polarizer 111 below the wiring region 320 and the display region 330 is not affected, and the normal display of the display region 330 is not affected.

In an embodiment, according to the manufacturing method, the gate drive region 310 is at a distance from the display region 330 and the wiring region 320, and therefore, when the polarizer 110 is pretreated below the gate drive region 310, the edge space is relatively large to facilitate treatment.

This application resolves the problem of optical current leakage in a gate drive region of a product and improves the reliability and service life of the product.

The wordings such as "in some embodiments" and "in various embodiments" are repeatedly used. The wordings usually refer to different embodiments, but they may also refer to a same embodiment. The words, such as "comprise", "have", and "include", are synonyms, unless other meanings are indicated in the context thereof.

Descriptions above are merely preferred embodiments of this application, and are not intended to limit this application. Although this application has been disclosed above in forms of preferred embodiments, the embodiments are not intended to limit this application. A person skilled in the art can make some equivalent variations, alterations or modifications to the above disclosed technical content without departing from the scope of the technical solutions of the above disclosed technical content to obtain equivalent embodiments. Any simple alteration, equivalent change or modification made to the foregoing embodiments according to the technical essence of this application without departing from the content of the technical solutions of this application shall fall within the scope of the technical solutions of this application.

What is claimed is:

1. A display panel, comprising:
an active switch array substrate, comprising:
a display region;
a bezel region, comprising a gate drive region and a wiring region; and
a polarizer, comprising a shield region, disposed on the active switch array substrate, wherein
the bezel region surrounds the display region and is located on a periphery of the display panel, the gate drive region is disposed on a periphery of the active switch array substrate, and the shield region covers the gate drive region;
wherein the polarizer comprises a polarizing material layer, and a refractive index of the polarizing material is in a range of 2.0 to 3.2, and an extinction coefficient of the polarizing material is in a range of 2.7 to 3.5.

2. The display panel according to claim 1, wherein the wiring region is spaced from the gate drive region.

3. The display panel according to claim 1, wherein the shield layer is made of a hyperchromic light-absorbing material.

4. The display panel according to claim 3, wherein the hyperchromic light-absorbing material is a black substance.

5. The display panel according to claim 4, wherein a material of the black substance comprises a phenolic resin, a photosensitive compound, an organic colored polymeric dye, an inorganic colored dye, and a solvent, and the phenolic resin, the photosensitive compound, the organic colored polymeric dye, the inorganic colored dye, and the solvent are mixed with each other.

6. The display panel according to claim 1, wherein a periphery of the polarizer is dehydrated and carbonized into a shield region after being pretreated by using a chemical reagent.

7. The display panel according to claim 6, wherein the chemical reagent is a corrosive reagent.

8. The display panel according to claim 1, wherein a periphery of the polarizer is carbonized into a shield region after a high-temperature and a high-pressure pretreatment.

9. A display panel, comprising:
an active switch array substrate, comprising:
a display region;
a bezel region, comprising a gate drive region and a wiring region; and
a polarizer, comprising a shield region, disposed on the active switch array substrate, wherein
the bezel region surrounds the display region and is located on a periphery of the display panel, the gate drive region is disposed on a periphery of the active switch array substrate, and the shield region covers the gate drive region, wherein
the wiring region is spaced from the gate drive region; and
a periphery of the polarizer is carbonized into a shield region after being pretreated by using a chemical reagent or after high-temperature and high-pressure pretreatment;
wherein the polarizer comprises a polarizing material layer, and a refractive index of the polarizing material is in a range of 2.0 to 3.2, and an extinction coefficient of the polarizing material is in a range of 2.7 to 3.5.

* * * * *